United States Patent Office 3,108,135
Patented Oct. 22, 1963

3,108,135
PREPARATION OF AROMATIC CARBOXYLIC ACIDS AND SALTS THEREOF
David O. De Pree, Baton Rouge, La., assignor to Ethyl Corporation, New York, N.Y., a corporation of Virginia
No Drawing. Filed Oct. 24, 1960, Ser. No. 64,270
12 Claims. (Cl. 260—515)

This invention relates to novel metallo substituted metallic salts of aromatic carboxylic acids and to a direct metalation process for the preparation of these novel compounds, as well as certain metal salts of aromatic carboxylic acid dimers.

Replacement of a hydrogen atom of an organic compound by an alkali metal atom has in the past been effected by a reaction between the organic compound and an alkali metal alkyl, e.g.

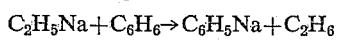

$$C_2H_5Na + C_6H_6 \rightarrow C_6H_5Na + C_2H_6$$

Rochow, Hurd and Lewis refer to such a reaction as a "metalation" reaction, which occurs only with strongly electropositive derivatives of the alkali and alkaline earth metals. (Rochow, E. C., D. T. Hurd, R. N. Lewis, The Chemistry of Organometallic Compounds, New York: John Wiley and Sons, Inc., 1957, pages 54–55.) In direct contrast to such a "metalation" reaction would be a "direct metalation" reaction in which a hydrogen on the ring of an aromatic carboxylic acid is replaced by an alkali metal through direct reaction between the carboxylic acid, or its salts, and the alkali metal itself. Such a "direct metalation reaction" has heretofore been unknown, but, would provide an excellent route for the preparation of novel ring substituted alkali metallo aromatic carboxylic acids and salts thereof. These materials are unique bifunctional aromatic substitution compounds, wherein an alkali metal has displaced a ring hydrogen, thus, combining for the first time in an aromatic system ring substituted alkali metal and carboxy functional groups. This structure results in a stable, yet highly reactive, bifunctional molecule, which is extremely useful as a chemical intermediate in synthesis of highly desirable products.

A direct metalation process would be the most simple, straightforward and econmical method for preparing the novel alkali metal substituted aromatic carboxylic acid salts, since only one atom of alkali metal would be consumed in a one-step displacement of one hydrogen atom, e.g.

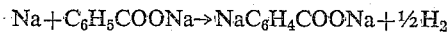

$$Na + C_6H_5COONa \rightarrow NaC_6H_4COONa + \tfrac{1}{2}H_2$$

whereas in a "metalation" reaction two atoms of metal are consumed in a two-step displacement of only one hydrogen atom, e.g.

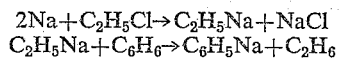

$$2Na + C_2H_5Cl \rightarrow C_2H_5Na + NaCl$$
$$C_2H_5Na + C_6H_6 \rightarrow C_6H_5Na + C_2H_6$$

It therefore is an object of this invention to provide novel group IA–IIA metal salts of alkali metal substituted aromatic carboxylic acids. It also is an object for the first time to provide a direct metalation process for the preparation of group IA–IIA metal salts of aromatic carboxylic acids, particularly the highly novel alkali metal substituted salts. Another object of this invention is the provision of a direct metalation process, employing unusually low, catalytic proportions of alkali metal, for preparing group IA–IIA metal salts of an aromatic carboxylic acid dimer. Other objects of this invention shall appear more fully hereinafter.

The above and other objects of this invention are accomplished by a process which comprises reacting an alkali metal with a group IA–IIA metal salt of an unsubstituted aromatic carboxylic acid, containing at least one hydrogen atom on the aromatic ring, at a temperature at which one atom of said hydrogen is displaced by one atom of said alkali metal. The temperature at which hydrogen is displaced by the alkali metal is evidenced by hydrogen evolution or by formation of alkali metal hydride.

In the above manner two types of group IA–IIA metal salts of aromatic carboxylic acids are produced. They are (1) a group IA–IIA metal salt of an aromatic carboxylic acid dimer (i.e. where 2 aromatic carboxylic acid nuclei are coupled together by a carbon-to-carbon bond) and (2) the highly novel compositions of this invention, i.e. an organo alkali metal compound in which an atom of alkali metal is directly bonded to a nuclear carbon atom of an aromatic carboxylic acid group IA–IIA metal salt.

The group IA–IIA metal salts of an alkali metal substituted carboxylic acid, which constitute the novel compositions of this invention, are demonstrated by the following general formula:

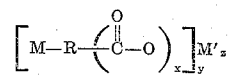

$$\left[ M-R-\!\!\left(\!\!\begin{array}{c}O\\ \|\\ C-O\end{array}\!\!\right)_{\!x}\right]_{\!y} M'_z$$

wherein M is an alkali metal (group IA metal), M' is an alkali or alkaline earth metal (group IA–IIA metal), R is an aromatic group, x equals 1 or 2, y equals 1 or 2, and z equals 1 or 2; $x+y+z$ being equal to 4 or 6, when M' is an alkaline earth metal, and $x+y+z$ being equal to 3 or 5 when M' is an alkali metal. It is preferred that M and M' be sodium because of sodium's cheapness, high reactivity, and large volume availability. Also, R is preferably a mononuclear aromatic group (i.e. containing only one aromatic ring), having 6 to about 12 carbon atoms. It is also preferred that x be 1. These latter preferences are founded on the economic and processing advantages of employing mononuclear monocarboxylic starting materials, as well as the high desirability of an alkali metal salt of an alkali metal substituted mononuclear aromatic monocarboxylic acid in producing extremely useful end products. The following illustrate the novel compounds of this invention: sodio-sodium benzoate, lithio-sodium benzoate, potassio-potassium benzoate, magnesium-bis-(sodio-benzoate), sodio-disodium terephthalate, sodio-calcium phthalate, sodio-sodium naphthoate, potassio-sodium benzoate, rubidio-sodium benzoate, cesio-sodium benzoate, and the like.

The group IA–IIA metal salts of an alkali metal substituted aromatic carboxylic acid are polyfunctional organometallic compounds. One of the functional groups is an alkali metal bonded directly to a ring carbon atom of the aromatic carboxylic acid, i.e.,

$$-\underset{|}{\overset{|}{C}}-M$$

and, in the case of monocarboxylic acids, the other functional group is a IA or IIA metal bonded directly to the oxygen atom of the carboxylic group, i.e.

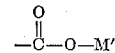

$$-\overset{O}{\overset{\|}{C}}-O-M'$$

By the same token, the dicarboxylic acid derivatives of this invention contain three reactive centers, two associated with the carboxylic acid salt bonding (oxygen-to-metal) and the third associated with the alkali metal bonded to a nuclear carbon atom of the aromatic nucleus (carbon-to-metal). Thus these polyfunctional compounds contain either two or three reactive centers making these compositions extremely useful as a tool in organic synthesis.

Some of the novel compositions of this invention are named as metallometallic carboxylates. An example is sodio-sodium benzoate. By this nomenclature the constituent designated as "metallo" is the alkali metal bonded directly to the carbon atom, and that designated as "metallic" is the metal atom bonded to the oxygen atom of the carboxylic group.

Either the novel alkali metal substituted product or the group IA–IIA metal salt of an aromatic carboxylic acid dimer can be produced in predominance by varying the conditions under which the reaction is conducted. For example, higher temperatures generally favor the formation of a group IA–IIA metal salt of an aromatic carboxylic acid dimer, whereas lower temperatures favor the formation of the novel group IA–IIA metal salt of an alkali metal substituted aromatic carboxylic acid.

These various reaction conditions will be discussed more fully hereinafter, but in general it is preferred to conduct the process with an alkali metal having an atomic number ranging from 11–55. Nevertheless, certain alkali metals are particularly preferred depending on the type of product to be produced in predominance. If the process is to be a catalytic preparation of a group IA–IIA metal salt of a unsubstituted aromatic carboxylic acid dimer, it is preferred to employ potassium or cesium as the catalysts, because of the excellent yield and fast rates of reaction which are experienced therewith. Sodium is also preferred because of its excellent economics, coupled with good yields and reaction rates. On the other hand, if it is desired to prepare a group IA–IIA metal salt of an alkali metal substituted aromatic carboxylic acid, then it is preferred to employ sodium as the metalating agent, since excellent yields and very favorable economics are experienced therewith. In carrying out the process of this invention it is also preferred to employ alkali metal salts of benzoic acid, since this material is an extremely cheap raw material which, through the process of this invention, can be converted into highly desirable products.

It is believed that this invention, in its preferred embodiments, provides the most simple, economical and straight-forward method of producing extremely pure, highly desirable group IA–IIA metal salts of aromatic carboxylic acid dimers and the novel group IA–IIA metal salts of alkali metal substituted aromatic acids. These salts can easily be converted to the corresponding acids. The dimers (e.g. biphenylene-p-p'-dicarboxylic acid and its salts) are excellent monomers for the preparation of condensation polymers. The group IA–IIA salts of alkali metal substituted aromatic carboxylic acids (e.g. sodio-sodium benzoate), upon carboxylation and hydrolysis, yield highly desirable dibasic acids which are monomers in the preparation of extremely useful condensation polymers. For example terephthalic acid, produced by the process of this invention from cheap toluene and sodium raw materials, is used in the preparation of polyester fibers and films (e.g. "Dacron" and "Terylene" fibers and "Mylar" and "Cronar" films).

Illustrative of this invention and a preferred embodiment thereof is the reaction of sodium with sodium benzoate to produce the sodium salt of p,p'-diphenylene dicarboxylic acid (e.g. the dimer of sodium benzoate) and the hitherto unknown p-sodio-sodium benzoate. This embodiment is generally conducted at a temperature ranging from about 150° C. up to the decomposition temperature of the lower decomposing sodium salt. Whether the dimer or the sodio derivative is produced in predominance, is dependent upon the temperatures and proportions employed. For example, when two equivalents of sodium are reacted with one equivalent of sodium benzoate at a temperature at which a ring hydrogen is displaced by the alkali metal (generally ranging from about 150 to about 180° C.) sodio-sodium benzoate is produced. However, when less than 0.2 equivalent of sodium, is reacted with one equivalent of sodium benzoate at a temperature at which a ring hydrogen is displaced by the metal (generally ranging from about 250° to about 300° C.) the sodium benzoate dimer is produced.

Having given an introduction into the subject invention, various process embodiments thereof will now be described. One such embodiment is a catalytic process for the preparation of a group IA–IIA metal salt of an aromatic carboxylic acid dimer which comprises reacting a group IA–IIA metal salt of an unsubstituted aromatic carboxylic acid, containing at least one hydrogen atom on the aromatic ring, with an alkali metal; said process being conducted at a temperature at which one atom of said hydrogen is displaced by one atom of said alkali metal, up to the decomposition temperature of the lower decomposing metal salt (i.e. either the group IA–IIA metal salt of an aromatic carboxylic acid dimer product or the group IA–IIA metal salt of an unsubstituted aromatic carboxylic acid reactant, whichever has the lowest decomposition temperature). The alkali metal is employed in catalytic amount—generally less than about 0.2 equivalents of alkali metal for each equivalent of unsubstituted aromatic carboxylic acid. The highly novel and unexpected feature of this embodiment is that it is a truly catalytic process wherein the molar output of the group IA–IIA metal salt of an aromatic carboxylic acid product is far in excess of the molar input of alkali metal catalyst. The alkali metal catalyst therefore apparently promotes the reaction of the group IA–IIA metal salt of an unsubstituted aroamtic carboxylic acid with itself to produce the dimer thereof. Certain alkali metals appear to have a greater catalytic effect in this embodiment than others, the catalytic activity increasing with the atomic weight of the alkali metal. Thus potassium and cesium, which exhibit excellent catalytic activity, are highly preferred catalysts of this embodiment of the invention. Sodium exhibiting somewhat lesser catalytic activity, but exhibiting extremely favorable economics, is also highly preferred.

Another embodiment of this invention is a process for the preparation of a group IA–IIA metal salt of an alkali metal substituted aromatic carboxylic acid which comprises reacting an alkali metal with a group IA–IIA metal salt of an unsubstituted aromatic carboxylic acid containing at least one hydrogen atom on the aromatic ring. This embodiment is conducted at a temperature ranging from the temperature at which one atom of said hydrogen is displaced by one atom of said alkali metal, up to the decomposition temperature of the group IA–IIA metal salt of the aromatic carboxylic acid. In carrying out this embodiment the amount of alkali metal used is generally greater than about 1 equivalent of the alkali metal for each equivalent of the metal salt of an unsubstituted aromatic carboxylic acid. Sodium has been found to be an excellent direct metalating agent in carrying out this embodiment and this fact, coupled with the favorable economics of sodium, makes it a highly preferred alkali metal for utilization therein.

Preparation of mixtures containing substantial amounts of both the group IA–IIA metal salt of an aromatic carboxylic acid dimer and the group IA–IIA metal salt of an alkali metal substituted aromatic carboxylic acid forms another embodiment of this invention. This process comprises reacting an alkali metal with a group IA–IIA metal salt of an unsubstituted aromatic carboxylic acid, containing one hydrogen atom on the aromatic ring, at a temperature ranging from the temperature at which one atom of said hydrogen is displaced by one atom of said alkali metal up to the decomposition temperature of the lower decomposing metal salt. In this embodiment the amount of alkali metal generally used ranges from about 0.2–1 equivalent of alkali metal to one equivalent of group IA–IIA metal salts of an unsubstituted aromatic carboxylic acid. In carrying out this embodiment it is generally preferred to employ sodium as the alkali metal since this material exhibits excellent reactivity. This embodiment is highly significant in that it provides an extremely simple process for simultaneously preparing both the highly desirable dimer and alkali metal substituted compound.

Another embodiment of this invention comprises preparation of a group IA–IIA metal salt of an aromatic carboxylic acid dimer by reacting an alkali metal with a group IA–IIA metal salt of an unsubstituted aromatic carboxylic acid, and thereafter heating the product thereby produced so as to convert it to the corresponding dimer. This embodiment is conducted at a temperature at which one atom of said hydrogen is displaced by one atom of said alkali metal up to the decomposition temperature of the lower decomposing metal salt. The amount of metal salt of an unsubstituted aromatic carboxylic acid salt used is greater than about 1 equivalent of acid salt for each equivalent of alkali metal. This process provides an extremely flexible and convenient method for preparing either the group IA–IIA metal salt of the alkali metal substituted aromatic carboxylic acid salt or the group IA–IIA metal salt of an aromatic carboxylic acid dimer. For example, the process can be stopped in its first step (i.e. before applying a heating period to convert to the dimer) and a portion of the alkali metal substituted product can be removed. Thereafter heating can be continued to convert the remaining alkali metal substituted aromatic carboxylic acid salt to the dimer. Thus both the group IA–IIA alkali metal substituted salt of an aromatic carboxylic acid and the group IA–IIA metal salt of an aromatic carboxylic acid dimer can conveniently be prepared.

The following working examples more fully demonstrate this invention. In these examples all parts and percentages are by weight.

Example I demonstrates the direct metalation of sodium benzoate (and in one case the free benzoic acid) with sodium metal, and the carboxylation of the sodio-sodium benzoate product to give, as one product, disodium terephthalate. The disodium terephthalate can be hydrolyzed to terephthalic acid. It is believed that this route for the preparation of terephthalic acid, using extremely low cost benzoic acid as a raw material, is the most simple and economical route for preparing terephthalic acid. The reaction is extremely rapid and initiates at low temperatures.

EXAMPLE I

*Preparation of sodio-sodium benzoate.*—Five preparations of sodio-sodium benzoate were carried out in pressure ballmills. Four of these preparations were carboxylated to give as a product disodium terephthalate, while the fifth was not carboxylated.

Sodium benzoate (or in one case benzoic acid) and sodium metal (filtered in the molten state to remove oxide) were charged to the pressure mill in 1/1 mol. ratio (in the case of benzoic acid, 2/1 mol. ratio) under nitrogen atmosphere. The contents of the mill were subjected to heating and grinding while the temperature was raised to 180–200° C. Gas evolution was measured by means of a wet test meter. In run No. 5 the red-brown sodio-sodium benzoate (136 parts) was discharged and stored under nitrogen. In the other four cases the sodio-sodium benzoate product was left in the mill for the carboxylation step. Detailed reaction conditions for each preparation and the results obtained appear in Table I.

*Carboxylation of sodio-sodium benzoate.*—The mill was allowed to cool after the metalation step and then pressurized with carbon dioxide to 250 p.s.i. and set to heating and grinding for a measured period of time. At the end of this period the bulk of the product (disodium terephthalate) was discharged dry and then the mill washed out with 1000 parts water to remove the residue. The dry product was then dissolved in the wash water and the solution filtered to remove insoluble impurities. The filtrate was acidified with the formation of a fine yellow precipitate. This was filtered off, washed with water, and dried by azeotroping out any water remaining with toluene. The solids were again filtered off and air dried to give an acid product which on infrared examination was found to contain terephthalic acid (as the major constituent), some isophthalic acid, essentially no phthalic acid and p,p'-diphenylene dicarboxylic acid. Detailed reaction conditions and the results obtained appear in Table I.

*Table I.—Preparation of Phthalic Acids*

| Run No. | Metalation | | | | Carboxylation | | |
| --- | --- | --- | --- | --- | --- | --- | --- |
| | Size Charge, mols | Time, Hrs. | Max. Temp. °C. | H₂ evol percent theory | Time, Hrs. | Max. Temp. °C. | Wt. Product (parts) |
| 1 | 1 | 7 | 189 | 41 | 7 | 92 | 50.0 |
| 2 | 1 | 7 | 200 | (¹) | 8¼ | 103 | 63.5 |
| 3 | 1 | 6¾ | 177 | 40 | 7¾ | 150 | 78.5 |
| 4 | (²) | 6¾ | 186 | 48.5 | 8 | 190 | 59.0 |
| 5³ | 1 | 6¼ | 194 | 39.5 | | | |

¹ Leak in system; some H₂ lost.
² Preparation from benzoic acid and sodium (1 mole benzoic acid and 2 mols sodium metal).
³ Sodio-sodium benzoate compound which was not carboxylated.

Examples II and III demonstrate dimerization of sodium benzoate to produce the disodium salt of diphenyl p,p'-dicarboxylic acid. This dibasic acid is an excellent monomer for production of condensation polymers. The process involves very low cost benzoic acid raw material and the para-isomer appears to be the major product, with very little decomposition taking place during the reaction. The reaction is considerably slower than the stoichiometric metalation of sodium benzoate (see Example I) and generally requires temperatures over 200° C.

EXAMPLE II

*Dimerization of sodium benzoate.*—Three reactions were carried out in which sodium benzoate was dimerized using an alkali metal catalyst. The reactions were carried out as follows:

Sodium benzoate (144 parts) and sodium, or potassium metal (less than 20% of equimolar quantity), were charged to the pressure mill under nitrogen atmosphere. The mill was heated and set to grinding for a measured period of time and the gas evolved measured by means of a wet-test meter.

The mill was then cooled and the dry product (a mixture of the disodium salt of biphenyl p,p'-dicarboxylic acid and the alkali metallo sodium benzoate e.g. sodio-sodium benzoate or potassio-sodium benzoate) discharged and spread on a tray to gradually hydrolyze, as indicated by the fading of the color produced by the presence of the alkali metallo-sodium benzoate content. The hydrolyzed product was dissolved in water and the water solution filtered to remove insoluble impurities. The filtrate was acidified with the precipitation of a mixture of benzoic acid and the p,p'-diphenyl dicarboxylic acid. These were then filtered off and dried. Detailed reaction conditions for these preparations appear in Table II.

The product from run No. 1 was refluxed with 300 parts of water and the insoluble acids filtered off and washed with 500 parts hot water. The 11.1 parts of product obtained did not melt below 300° C. Infrared examination of the product showed it to be neither benzoic nor terephthalic acids, but that it was a para-substituted dibasic acid which was identified as biphenyl p,p'-dicarboxylic acid by the preparation of the dimethyl ester. (Reaction with excess methanol at 300° C. for 1 hour, zinc dust catalyst.) The ester was purified by sublimation at 200° C. followed by recrystallization from methanol (melting point obtained 214° C.; M.P. lit. 214° C.). The molecular weight of the crude acid, as determined by neutral equivalent, was 262 (theory=242).

The cryoscopic molecular weight in 1,4-dioxane found for the dimethyl ester of the biphenyl-p,p'-dicarboxylic acid was 284±25. This is in good agreement with the calculated value, 270.3.

Table II.—Dimerization of Sodium Benzoate

| Run No. | Catalyst (parts) | Time, Hrs. | Max. Temp. °C. | H₂ evol. percent Theory | Remarks |
|---|---|---|---|---|---|
| 1 | Na, 4.4 | 5¾ | 246 | 37 | H₂ evolution still going on when heat shut off. |
| 2 | Na, 2.0 | 5 | 230 | 25 | Do. |
| 3 | K, 5.0 | 14 | 252 | 42 | Do. |

EXAMPLE III

*Preparation of p,p'-biphenyl dicarboxylic acid.*—Seven reactions were carried out in the study of the coupling of sodium benzoate to form the disodium salt of biphenyl-p,p'-dicarboxylic acid. The reactions were carried out as follows:

Sodium benzoate (144.1 parts) and the alkali metal catalyst were charged to the mill under nitrogen atmosphere. The mill was heated and set to grinding for a measured period of time and the gas evolved measured by means for a wet test meter. The mill was then cooled and the dry product [predominantly the disodium salt of p,p'-biphenylene dicarboxylic acid and some alkali metallo (i.e. sodio, potassio or cesio) sodium benzoate] discharged and either spread on a tray to hydrolyze, or hydrolyzed under nitrogen atmosphere. The mill was washed out with 1500 parts of water and the hydrolyzed solids (disodium p,p'-biphenyl dicarboxylate and sodium benzoate) were dissolved in the wash water. The solution obtained was filtered to remove insoluble impurities and the filtrate acidified to give a heavy precipitate. The precipitate was filtered off and then suspended in 600–1000 parts of boiling water to dissolve any benzoic acid. The insoluble biphenyl p,p'-dicarboxylic acid was filtered off washed with 1000 parts of boiling water, dried and weighed.

Detailed conditions for the preparation and the product yields obtained appear in Table III.

Table III.—Preparation of Biphenyl-p,p'-Dicarboxylic Acid

| Run No. | Metal Cat., g. | Time, Hrs. | Max. Temp., °C. | Wt. Product Recovered | Yield, percent |
|---|---|---|---|---|---|
| 1 | Na, 11.0 | 14 | 242 | 44.8 | 37 |
| 2 | Na, 2.0 | 6¼ | 305 | 40.6 | 33 |
| 3 | K, 4.0 | 7 | 310 | 31.5 | 26 |
| 4 | K, 2.0 | 7 | 315 | 37.2 | 31 |
| 5 | K, 1.0 | 7 | 294 | 6.2 | 5 |
| 6 | K, 1.0 | 6 | 321 | 30.5 | 25 |
| 7 | Ca, 2.0 | 5½ | 266 | 48.7 | 40 |

The following example sets forth the direct metalation of sodium-1-naphthoate with sodium metal. This example demonstrates the ring-metalation of salts of unsubstituted condensed ring aromatic carboxylic acids.

EXAMPLE IV

*Metalation of sodium-1-naphthoic acid.*—1-naphthoic acid (86.1 parts) and sodium metal (filtered molten to remove oxides) (24.5 parts) were charged to a pressure mill under nitrogen atmosphere. The contents of the mill were ground and the mill heated to 180–187° C. for a period of 6¼ hours, and the hydrogen evolved (4.1 liters at std. temp. and press.) measured by means of a wet test meter. The gas evolution is 36.6 percent of theoretical and indicates at least 36.6 percent conversion to the sodio derivative. The product was a dark greenish-brown in color.

*Carboxylation of sodio-sodium naphthoate.*—The mill was allowed to cool after the metalation step and then pressurized with carbon dioxide to 250 p.s.i. and set to heating and grinding for 7 hours (maximum temperature 185° C.). The product was discharged and dissolved in water. The water solution was filtered to remove impurities and then acidified to give a red precipitate. The precipitate was filtered off, washed with water and dried (wt.=38.5 parts). Infrared examination of the acid product indicated it to be dicarboxy naphthalene.

In the following example disodium isophthalate was metalated with sodium to give, on carboxylation and hydrolysis, a tricarboxybenzene.

EXAMPLE V

*Reaction of disodium isophthalate with sodium metal.*—Disodium isophthalate was reacted with sodium metal in a ballmill following the procedure described in Example I. The reaction was conducted in the following manner:

Disodium isophthalate (105 parts; 0.5 mol) and sodium metal (13.5 parts, filtered to remove oxide) were charged to the ballmill under nitrogen atmosphere. The mill was heated and set to grinding and the gas evolved measured by means of a wet test meter. The mill, after the metalation step, was cooled, then pressurized to 250 p.s.i. with carbon dioxide, heated and set to grinding for a measured period of time. The product obtained, the trisodium salt of tricarboxy benzene, was dissolved in water, acidified and the water insoluble ppt. recovered and subjected to infrared examination. The reaction details and the results obtained appear in Table IV.

Table IV.—Metalation of Disodium Isophthalate

| Starting Material | Metalation | | | Carboxylation | | Analysis of Prod.[1] |
|---|---|---|---|---|---|---|
| | Time, Hrs. | Max. Temp., °C | H₂ Evol., percent Theory | Time, Hrs. | Max. Temp., °C. | |
| Disodium isophthalate. | 6¾ | 192 | 26 | 8 | 120 | 64 parts of product found to contain tricarboxy benzene. |

[1] Product identified by infrared examination.

The group IA–IIA metal salts of an unsubstituted aromatic carboxylic acid employed as the reactant in the process of this invention generally contains from 6 to about 14 carbon atoms. Although aromatic carboxylic acid salts containing more than one carboxylic acid functional group can be employed herein, as is demonstrated in Example V, it is preferred to employ a group IA–IIA metal salt of an unsubstituted aromatic monocarboxylic acid containing from 6 to about 14 carbon atoms. Further illustrative of the unsubstituted carboxylic acid salts utilized in the process of this invention are potassium benzoate, lithium benzoate, rubidium benzoate, cesium benzoate, cesium 1-naphthoate, the magnesium salt of 1-naphthoic acid, calcium benzoate, barium benzoate, beryllium benzoate, the lithium salt of 1-anthranoic acid, the sodium salt of 4-indenoic acid, the lithium salt of 1-fluorenoic acid, the disodium salt of terephthalic acid, the disodium salt of 1,4-dicarboxy naphthalene and the like.

The aromatic portion of the unsubstituted aromatic carboxylic acid salt reactants and the novel group IA–IIA metal salts of an alkali metal substituted aromatic carboxylic acid of this invention, in general, is an aromatic group containing up to 14 carbon atoms. It is preferred that the aromatic constituent be a mononuclear aromatic group having 6 to about 12 carbon atoms. Exemplary of such aromatic groups are aromatic radicals derived from benzene, naphthalene, anthracene, phenanthrene, fluorene, indene, isoindene, tetralin and the like substituted aromatic hydrocarbon ring systems containing 6 to about 14 carbon atoms.

The group IA–IIA metals which are a constituent of the metal salts employed as reactants and produced as products herein refer to the group IA–IIA metals of the "Periodic Chart of the Elements" published by Fischer Scientific Company (1955), and include the group IA metals lithium, sodium, potassium, rubidium, cesium and francium (although the latter is rarely employed for economic reasons); and beryllium, calcium, magnesium, strontium, barium and radium (radium is not economically attractive because of its high cost) of group IIA. These group IA–IIA metals are often referred to as light metals (see Periodic Chart of the Elements set forth at pp. 58–59 of Lange's Handbook of Chemistry, 6th Ed., Handbook Publishers, Inc., Sandusky, Ohio).

The direct metalating agent of this invention is an alkali metal (i.e. a group IA metal as defined above). These metals can be employed as catalysts in this invention and when used as such have been found to exhibit increased catalytic activity with increased atomic weight. In the catalytic embodiment of this invention any of the alkali metals can be employed, however, it is preferred to employ sodium, potassium and cesium, as has been discussed hereinbefore. In carrying out this catalytic embodiment, francium, although quite expensive, can be employed because of the small amount necessitated to make the reaction occur.

The temperatures employed in this invention range from those sufficient to displace one hydrogen atom from the aromatic ring of the unsubstituted aromatic carboxylic acid salt with one atom of alkali metal—as is evidenced by hydrogen evolution or by presence of alkali metal hydride in the reaction product mixture—up to the decomposition temperature of the lower decomposing metal salt (i.e. either product or reactant, as discussed hereinbefore). In general as the amount of alkali direct metalating agent is increased the temperature is lowered in order to avoid undesirable side reactions. Thus when employing one equivalent or more of alkali metal for one equivalent of group IA–IIA metal salt of an unsubstituted aromatic carboxylic acid, temperatures generally less than 200° C. are employed. When utilizing the last-mentioned proportions and employing sodium as the direct metalating agent it is preferred to employ a temperature ranging from about 100° C. to about 200° C., since within this temperature range less decomposition leading to undesirable by-products has occurred. When a coupling reaction is run leading to production of a group IA–IIA metal salt of an aromatic carboxylic acid dimer, generally temperatures are employed greater than about 200° C. In general it is preferred to employ temperatures above 250° C. particularly when sodium, potassium and cesium are employed in the preparation of the carboxylic acid salt dimer.

Important to which product is produced in predominance is the proportion of reactants employed. Thus, employing proportions greater than one equivalent of alkali metal for each equivalent of a group IA–IIA metal salt of an unsubstituted aromatic carboxylic acid favors the formation of a group IA–IIA metal salt of an alkali metal substituted aromatic carboxylic acid. (An equivalent of alkali metal, as used herein, is one atom of alkali metal and an equivalent of a group IA–IIA metal salt of an unsubstituted aromatic carboxylic acid is a number equal to the number of displaceable ring carbon-hydrogen bonds contained therein. In general one equivalent of the metal salt of an unsubstituted carboxylic acid is equal to one mole thereof.) If less than one equivalent of alkali metal is employed for each equivalent of said metal salt, formation of mixtures of the alkali metal substituted acid salt and the acid salt dimer are favored. However, when the proportions employed are less than 0.2 equivalent of alkali metal for each equivalent of a group IA–IIA metal salt of an unsubstituted aromatic carboxylic acid, forma- tion of the dimer is predominantly favored. When the latter proportions are employed the process of the instant invention appears to be catalytic in that the moles of product produced are far in excess of the alkali metal molar input.

Thus, in this last embodiment, it appears that the alkali metal acts as a catalyst promoting the reaction of a group IA–IIA metal salt of an unsubstituted aromatic carboxylic acid with itself. This catalytic process apparently occurs by initial displacement of a hydrogen from a ring carbon of the unsubstituted aromatic carboxylic acid salt by the alkali metal, as is evidenced by the presence of alkali metal hydride in the product mixture.

Thus proportions in general range from catalytic amounts of the alkali metal direct metalating agent (i.e. less than 0.2 equivalent of alkali metal for each equivalent of acid salt utilized in the reaction) up to excess of an alkali metal direct metalating agent (on an equivalent basis). Although no detrimental effects upon the course of the reaction have been observed employing large excesses of the alkali metal in preparing the group IA–IIA alkali metal substituted aromatic carboxylic acid, it is generally desirable for economic reasons to employ a ratio no greater than about 3.5 equivalents of alkali metal for each equivalent of group IA–IIA metal salts of an unsubstituted aromatic carboxylic acid.

When the process of this invention is conducted so that the hydrogen displaced on the aromatic ring by the alkali metal is evolved as a gas, then the process is preferably conducted at atmospheric and subatmospheric pressure. Subatmospheric pressures enhance the removal of hydrogen gas and therefore increase the rate of reaction.

The process of this invention can be run in a wide diversity of processing equipment. However, particularly excellent results have been obtained when the aforesaid metalating agent is reacted with the aforesaid group IA–IIA metal salt of an unsubstituted aromatic carboxylic acid while mixing and grinding the reactants. For this purpose it is preferred to employ a ballmill reaction vessel. In general, a stainless steel (such as ASTM 316 Stainless Steel) ballmill reactor is employed. This ballmill is provided with an outlet means and a means for charging, while maintaining the reaction mass under an inert atmosphere or pressure. The mill is generally operated with about a 30 percent ball charge and at a rotational speed of about 60 percent of critical. Other processing equipment is available and can successfully be used. Thus batch reactors, or mixers using pre-ground reactants, such as stirred, heated reaction vessels, or Baker-Perkins mixers, and continuous reactors or converters can be employed in the subject process.

Although solvents can be employed in this reaction it is generally preferred to run the reaction without a solvent. This generally means that the reaction is run as a solid—solid heterogeneous reaction since the reactants are generally solid—at least at the temperature at which the reaction commences. When the reaction is conducted as such a heterogeneous solid—solid reaction it is generally preferred to conduct it in a ballmill reactor while mixing and grinding is effected. Carrying the reaction out while mixing and grinding has been found to be beneficial, even though the ultimate reaction temperature is above the melting point of the alkali metal employed. For some purposes, however, it is desirable to conduct the reaction under an inert liquid blanket—preferably the cheap high boiling paraffinic hydrocarbons, such as mineral oil, and inert ethers like the dimethyl ether of diethylene glycol, tetrahydrofuran, the diethyl ether of diethylene glycol and the like.

The particle size of reactants is important. In general, it is preferred to employ particle sizes below about 100 microns and usually below about 50 microns. The smaller the particle size, the shorter the reaction periods. Thus, best results have been obtained when the particle size of the reactants is less than 10 microns. In carrying out the process, the reactants are mixed and ground in the reaction vessel and heated. Although not required, this is the preferred operation. It should be understood that the reactants can also be pre-ground or pre-mixed, and further, can be fed to the reactor separately in larger particle sizes and thereafter mixed and ground in situ. This is particularly true when the agitation provided in the reactor is of a type to provide grinding of the reaction mixture during the course of the reaction. Employing the technique of the grinding, along with the agitation provides more complete reaction. One highly preferred method of obtaining this objective is to employ a ballmill as a reactor, although any tumbling mill can be employed, such as a pebble mill, rod mill, tube mill or compartment mill. Other milling apparatus can also be employed as will now be evident to those skilled in the art.

The reaction should be conducted in an inert atmosphere such as argon, nitrogen, krypton and the like. It is preferable that the inert atmosphere be pre-purified so as to be substantially free of impurities, such as oxygen and moisture, since these impurities may be taken up in the product.

The time of the reaction varies from instantaneous to about 20 hours. Generally the reaction is conducted over a period of 4 hours to about 15 hours. These times are generally related to the rates of attrition and heat transfer. Thus time will be dependent upon the type of equipment utilized. Best times have been achieved utilizing ballmill equipment.

I claim:

1. An alkali metal salt in which an atom of alkali metal is directly bonded to a nuclear carbon atom of an unsubstituted group IA–IIA metal salt of an aromatic carboxylic acid containing from 6 to about 14 carbon atoms.

2. An alkali metal salt in which an atom of alkali metal is directly bonded to a nuclear carbon atom of an unsubstituted alkali metal salt of an aromatic carboxylic acid containing from 6 to about 14 carbon atoms.

3. An alkali metallo sodium benzoate.

4. Sodio-sodium benzoate.

5. Sodio-sodium naphthoate.

6. A process for the preparation of a group IA–IIA metal salt of an aromatic carboxylic acid dimer associated with an alkali metal salt in which an atom of an alkali metal is directly bonded to a nuclear carbon atom of an unsubstituted group IA–IIA metal salt of an aromatic carboxylic acid containing from 6 to about 14 carbon atoms, which process comprises reacting (a) an alkali metal with (b) a group IA–IIA metal salt of an unsubstituted aromatic carboxylic acid having from 6 to about 14 carbon atoms and containing at least one hydrogen atom on the aromatic ring; at a temperature ranging from about 100° C. to about 200° C. sufficient to displace one hydrogen atom from the aromatic ring of said unsubstituted aromatic carboxylic acid; said reaction being conducted in an inert atmosphere.

7. The process of claim 6 wherein said alkali metal reactant has an atomic number of 11–55 and each of said group IA–IIA metal salts is an alkali metal salt.

8. A process for the preparation of a group IA–IIA metal salt of an aromatic carboxylic acid dimer which comprises reacting (a) an alkali metal with (b) a group IA–IIA metal salt of an unsubstituted aromatic carboxylic acid having from 6 to about 14 carbon atoms and containing at least one hydrogen atom on the aromatic ring; said process being conducted at a temperature ranging from about 200° C. to about 300° C., the temperature being above the temperature at which one atom of said hydrogen is dipslaced by one atom of said alkali metal, the alkali metal being employed in catalytic proportions of less than about 0.2 equivalent of alkali metal per equivalent of the metal salt of an unsubstituted aromatic carboxylic acid, said reaction being conducted in an inert atmosphere.

9. A process for the preparation of an alkali metal salt in which an atom of an alkali metal is directly bonded to a nuclear carbon atom of an unsubstituted group IA–IIA metal salt of an aromatic carboxylic acid containing from 6 to about 14 carbon atoms associated with, a group IA–IIA metal salt of an alkali metal substituted aromatic carboxylic acid dimer which process comprises reacting (a) an alkali metal with (b) a group IA–IIA metal salt of an unsubstituted aromatic carboxylic acid having from 6 to about 14 carbon atoms and containing at least one hydrogen atom on the aromatic ring; at a temperature ranging from about 100° C. to about 200° C. sufficient to displace one hydrogen atom from the aromatic ring of said unsubstituted aromatic carboxylic acid; the amount of said alkali metal employed being greater than about one equivalent of the alkali metal per equivalent of the metal salt of an unsubstituted aromatic carboxylic acid, said process being conducted in an inert atmosphere.

10. A process for the preparation of the sodium salt of p,p'-biphenyl dicarboxylic acid which comprises reacting (a) an alkali metal having an atomic number of 11–55 with (b) sodium benzoate at a temperature greater than about 200° C.; said metal being employed in catalytic proportions of less than about 0.2 equivalent of said metal per equivalent of said benzoate, said process being conducted in an inert atmosphere.

11. A process for the preparation of sodio-sodium benzoate which comprises reacting (a) sodium with (b) sodium benzoate at a temperature ranging from about 100° C. to about 200° C. sufficient to displace one atom of hydrogen from the aromatic ring of said sodium benzoate; said sodium being employed in a proportion of about one equivalent of sodium per equivalent of sodium benzoate; said process being conducted in an inert atmosphere.

12. A process for the preparation of sodio-sodium benzoate which comprises reacting (a) sodium with (b) sodium benzoate at a temperature ranging from 100° to 200° C., said sodium and sodium benzoate being employed in a proportion of about 1–2 equivalents of sodium per equivalent of sodium benzoate, said process being conducted in an inert atmosphere.

No references cited.